(12) United States Patent
Verschoor et al.

(10) Patent No.: US 9,258,136 B2
(45) Date of Patent: Feb. 9, 2016

(54) BROWSER WITH DUAL SCRIPTING ENGINE FOR PRIVACY PROTECTION

(75) Inventors: Michael Petrus Franciscus Verschoor, Eindhoven (NL); Walter Dees, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 178 days.

(21) Appl. No.: 13/143,573

(22) PCT Filed: Jan. 13, 2010

(86) PCT No.: PCT/IB2010/050127
§ 371 (c)(1),
(2), (4) Date: Jul. 7, 2011

(87) PCT Pub. No.: WO2010/082161
PCT Pub. Date: Jul. 22, 2010

(65) Prior Publication Data
US 2011/0283363 A1 Nov. 17, 2011

Related U.S. Application Data

(60) Provisional application No. 61/172,801, filed on Apr. 27, 2009, provisional application No. 61/145,646, filed on Jan. 19, 2009.

(51) Int. Cl.
*H04L 29/06* (2006.01)
*H04L 12/28* (2006.01)
*G06F 21/53* (2013.01)

(52) U.S. Cl.
CPC ............ *H04L 12/2818* (2013.01); *G06F 21/53* (2013.01); *H04L 12/2814* (2013.01); *G06F 2221/2105* (2013.01); *H04L 63/04* (2013.01); *H04L 63/10* (2013.01)

(58) Field of Classification Search
CPC ....... G06F 21/53; G06F 21/00; G06F 21/121; G06F 21/128; G06F 2221/2149; G06F 17/30861; G06F 17/30899; H04L 29/06095

USPC .......................................................... 726/26
See application file for complete search history.

(56) References Cited

U.S. PATENT DOCUMENTS 6,308,275 B1 * 10/2001 Vaswani et al. .................. 726/2
6,608,634 B1    8/2003 Sherrard et al.
(Continued)

FOREIGN PATENT DOCUMENTS

WO    2005002139 A1    1/2005
WO    2005031568 A1    4/2005
WO    2006106414 A2    10/2006

OTHER PUBLICATIONS

Lewis, B., 'Sandbox Computing', Semco.org, DataBus newsletter, 3/3009, vol. 34, pp. 8-10, http://www.semco.org/newsletter/DataBus200903.pdf.*

(Continued)

*Primary Examiner* — Christopher Brown
*Assistant Examiner* — Ronald Baum

(57) ABSTRACT

A data processing system has a browser with scripting engine means for executing a script. The scripting engine means implements a public scripting engine and a private scripting engine. The browser is configured to have the script executed by the public scripting engine if the script does not require access to a pre-determined resource at the system. The browser is configured to have the script executed by the private scripting engine if the script requires access to the pre-determined resource. Only the private scripting engine has an interface for enabling the script to access the predetermined resource. The scripting engine means is configured to prevent the private scripting engine from communicating data to the public scripting engine or to a non-approved server external to the data processing system.

6 Claims, 1 Drawing Sheet

(56) References Cited

U.S. PATENT DOCUMENTS

| | | | |
|---|---|---|---|
| 6,931,546 B1 | 8/2005 | Kouznetsov et al. | |
| 7,343,626 B1* | 3/2008 | Gallagher | 726/25 |
| 7,401,230 B2* | 7/2008 | Campbell et al. | 713/190 |
| 7,546,447 B2* | 6/2009 | Chen et al. | 713/1 |
| 7,593,980 B2* | 9/2009 | Marascio et al. | 709/201 |
| 7,676,560 B2* | 3/2010 | McCollum | 709/223 |
| 7,707,635 B1* | 4/2010 | Kuo et al. | 726/24 |
| 7,836,303 B2* | 11/2010 | Levy et al. | 713/168 |
| 7,908,653 B2* | 3/2011 | Brickell et al. | 726/22 |
| 7,979,909 B2* | 7/2011 | Jancula et al. | 726/26 |
| 8,001,551 B2* | 8/2011 | Le Roy et al. | 719/311 |
| 8,024,790 B2* | 9/2011 | Zhao et al. | 726/17 |
| 8,078,740 B2* | 12/2011 | Franco et al. | 709/229 |
| 8,108,912 B2* | 1/2012 | Ferris | 726/3 |
| 8,136,158 B1* | 3/2012 | Sehr et al. | 726/22 |
| 8,160,247 B2* | 4/2012 | Agrawal et al. | 380/44 |
| 8,250,666 B2* | 8/2012 | Karabulut et al. | 726/29 |
| 8,353,031 B1* | 1/2013 | Rajan et al. | 726/22 |
| 8,402,441 B2* | 3/2013 | Budko et al. | 717/127 |
| 8,413,139 B2* | 4/2013 | Shukla et al. | 718/1 |
| 8,490,117 B1* | 7/2013 | Brichford | 719/328 |
| 8,595,480 B2* | 11/2013 | Dimitrakos et al. | 713/153 |
| 8,839,138 B1* | 9/2014 | Pasqua | G06F 9/45558 715/703 |
| 2003/0014479 A1* | 1/2003 | Shafron et al. | 709/203 |
| 2003/0066031 A1* | 4/2003 | Laane | 715/513 |
| 2003/0229900 A1* | 12/2003 | Reisman | 725/87 |
| 2004/0148337 A1 | 7/2004 | Duncan | |
| 2005/0091536 A1* | 4/2005 | Whitmer et al. | 713/201 |
| 2006/0143688 A1* | 6/2006 | Futoransky et al. | 726/1 |
| 2007/0226773 A1* | 9/2007 | Pouliot | 726/1 |
| 2008/0028059 A1 | 1/2008 | Shin et al. | |
| 2008/0133722 A1* | 6/2008 | Ramasundaram et al. | 709/222 |
| 2008/0148298 A1* | 6/2008 | Chatterjee et al. | 719/328 |
| 2008/0178286 A1* | 7/2008 | Deyo | 726/22 |
| 2008/0189767 A1* | 8/2008 | Kothari et al. | 726/4 |
| 2008/0196046 A1* | 8/2008 | Athas et al. | 719/320 |
| 2009/0064301 A1* | 3/2009 | Sachdeva et al. | 726/9 |
| 2009/0089879 A1* | 4/2009 | Wang et al. | 726/24 |
| 2009/0222925 A1* | 9/2009 | Hilaiel et al. | 726/25 |
| 2009/0300764 A1* | 12/2009 | Freeman | 726/24 |
| 2010/0005449 A1* | 1/2010 | Karabulut et al. | 717/120 |
| 2010/0257578 A1* | 10/2010 | Shukla | G06F 21/6218 726/1 |
| 2010/0306773 A1* | 12/2010 | Lee et al. | 718/1 |

OTHER PUBLICATIONS

IBM, 'IBM WebSphere Application Server Network Deployment, Version 5.1 Applications', International Business Machines Corporation, 2003, entire document, ftp://public.dhe.ibm.com/software/webserver/appserv/library/wasv5lnd_apps.pdf.*

Strom, C., 'Dart 1 for Everyone—Fast, Flexible, Structured Code for the Modern Web', 2014, The Pragmatic Programmers, LLC., entire document, http://178.63.94.202/ebook2/9069-Dart%201%20for%20Everyone.PDF.*

Anupam et al: Secure Web Scripting; Internet Computing, IEEE, Nov.-Dec. 1998, vol. 2, Issue 6, pp. 46-55. 23 Page Document.

"Telecommunication Standardization Sector"; International Telecommunication Union, Focus Group on IPTV, 7th FG IPTV Meeting, Qawra, Malta, Dec. 2007.

Dees et al:"Web4CE: Accessing Web-Based Applications on Consumer Devices"; WWW 2007 Poster Paper, Topic:Systems, pp. 1303-1304.

* cited by examiner

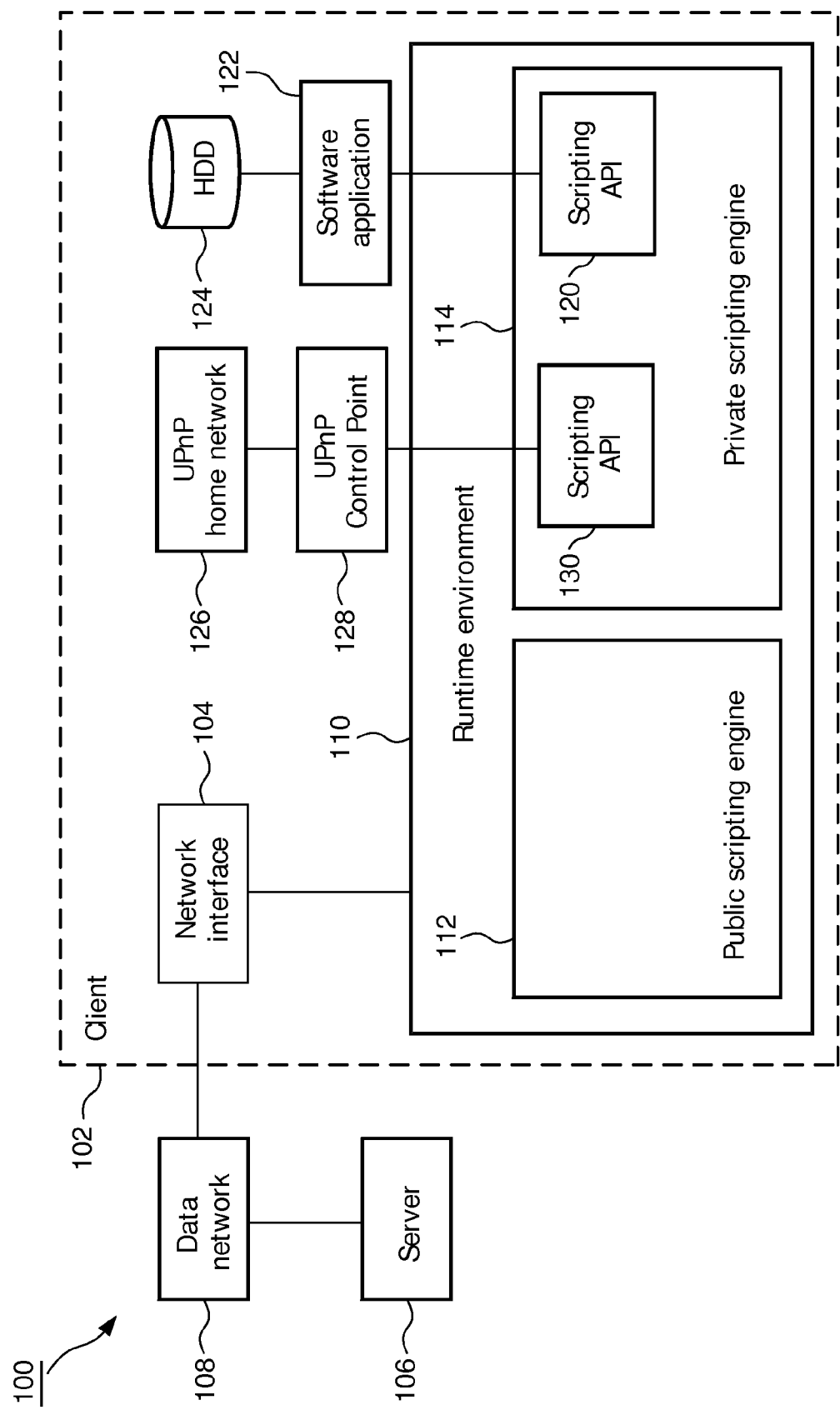

BROWSER WITH DUAL SCRIPTING ENGINE FOR PRIVACY PROTECTION

FIELD OF THE INVENTION

The invention relates to a data processing system comprising a runtime environment with scripting engine means for executing a script, to a runtime environment comprising scripting engine means, to a computer program product comprising computer-executable instructions, and to a data structure representing a script including an execution control indication.

BACKGROUND ART

The use of networked electronic devices has become increasingly more prevalent. In the field of home-networks, remote user interfaces are provided for consumer electronics (CE) devices in UPnP (Universal Plug and Play) networks. Remote user interfaces enable the user to remotely control applications on other UPnP devices via a UPnP home network, and also to interact with Internet services using CE devices that are connected to the Internet. An example of such Internet service is one from which the user can download content information, such as movies. For more background on UPnP, see, e.g., WO 2005/002139.

In view of the multitude of providers of Internet services, the different types of services and the multitude of consumer device suppliers involved, it is preferable to standardize the communication protocols and user interfaces as much as possible so as to provide the best experience for the user.

One such standard is CEA-2014 (also known as Web4CE), a Consumer Electronics Association (CEA) standard. See, e.g., "Web4CE: Accessing Web-based Applications on Consumer Devices", W. Dees and P. Shrubsole, WWW 2007/ Poster Paper, Topic: Systems, pp. 1303-1304. The standard specifies a web-based protocol and an XHTML-based content format referred to as CE-HTML, for remote user interfaces on UPnP networks and the Internet. CE-HTML is based on common open Internet languages such as Javascript 1.5, XHTML 1.0 and CSS TV Profile 1.0. CE-HTML specifies the content format and scripting semantics for the interactive services, and defines the browser environment that will host and render those services. The standardization of the current version of CE-HTML is mainly driven forward in two standardization bodies, namely in the Consumer Electronics Association (CEA) and in the Open IPTV Forum (OIPF). CEA-2014 has two main applications: first it allows consumers to remotely control applications on other UPnP devices over a UPnP home network. Second it allows consumers to interact with Internet Services or web-based applications using consumer devices that are connected to the Internet. The user interaction may take place using just the remote control, the keys or the touch screen of the device containing a CEA-2014 compatible browser, e.g. a Media Adaptor, a TV or a mobile phone.

Typically, a web browser is used to render an electronic document in HTML format, but a host of special-purpose languages has been developed to control the browser's operation via executable content embedded in the HTML document. The executable content adds, e.g., interactivity and automation to the browser. Examples of these special-purpose languages are: ECMAScript, a versatile procedural scripting language superficially resembling Java; Cascading style sheets (CSS), which enable style metadata to be abstracted from content; XML, which can be used for content in conjunction with style metadata, as an alternative to HTML; and XSLT, a presentation language that transforms XML content into a new form. Techniques have evolved that involve the combination of XML and JavaScript scripting to improve the user's subjective impression of responsiveness. The Document Object Model standard ensures that all browsers respond in a predictable manner to the same JavaScript (Source: Wikipedia). Furthermore, the browser environment can be extended by a plug-in to display and/or interact with foreign content, such as Adobe Flash. Foreign content may be visual or non-visual and may offer a scripting API that can be used by the scripting engine. Accordingly, a web browser provides a client-side runtime environment for web applications and for executing scripts embedded in an electronic document, e.g., downloaded from a server. For more background on scripting, also see, e.g., WO 2006/106414.

A script embedded in the electronic document may be abused by the document provider to tamper with the system onto which the document has been downloaded or to obtain privacy-sensitive information about the system's user. That is, executing a script received in a downloaded document may hamper the system's security and the user's privacy.

The paper "Secure Web scripting", V. Anupam and A. Mayer, Internet Computing IEEE Vol. 2, issue 6, November/December 1998, pp. 46-55 discusses an explicit security model. The model proposed has been implemented for JavaScript in the Mozilla browser source code. It is realized by a "safe" interpreter and based on three basic building blocks: access control, independence of contexts and trust management. Access control regulates what data a script can access on a user's machine and in what mode. Independence of contexts ensures that two scripts executing in different contexts (for example, simultaneously in different browser windows or sequentially in the same browser window) cannot access each other's data at will. Trust management regulates how trust is established and terminated among scripts executing simultaneously in different contexts. Different users require different degrees of privacy and security, which translate to different degrees of flexibility when interacting with a Web server. These differences can be expressed in different, user-chosen security policies. The security policy chosen provides for padded cells for scripts. By means of partitioning the name space into inaccessible, read-only and writable items, access control ensures that scripts only have access to those parts of the browser- and window related data that do not compromise a user's privacy while browsing. The security policy also regulates access to external interfaces. Furthermore, independence of contexts ensures that there are no "hidden channels" among scripts in different contexts. For example, if a writable item persisted across changes of context (as is currently the case in JavaScript), it could be used as a user-invisible (albeit non-persistent) "cookie" accessible to collaborating Web sites. Data provided by a user in a first context of a certain window (for example, by filling out a form in this context's HTML document) is only available to scripts in a second context, if the second context is in the first context's access control list (ACL). Scripts in any other context however, are not able to access this data.

WO2006/106414, mentioned above, discusses domain security with script objects. This publication discloses a method of providing domain security with script objects. The method includes generating an exception when a first script object with a first owner attempts access to a second script object with a second owner, generating a dialogue to the second owner querying for the grant of access rights to the second script object, and carrying out instructions whether to grant the first script object access rights to the second script object. The instructions are responsive to the generated dialogue to the second owner. As to the term "owner": the owner of an electronic document is a domain that issued the document. The owner of any object which represents a local resource (e.g., a client database or file) is a local user. As known, an exception within this context is the occurrence of a condition that changes the normal flow of the execution of software instructions. The computer code designed to handle exceptions is referred to as an "exception handler".

WO 2005/031568 relates to presenting remote and local services and information in the same user interface by means of a web browser. The web browser contains an ECMAScript engine. This engine is extended by an ECMAScript extension module (the standardized version of the core JavaScript language) that is communicating with the device native environment through a ECMAScript extension library. This allows the ECMAScript environment to be extended with new classes and methods implemented in native code (rather like Java Native Interface, JNI in Java). The ECMAScript engine and ECMAScript extension module can be conditionally compiled into a build of a web browser on potentially any software platform. Once a build of a web browser has been created with the ECMAScript extension functionality enabled, then the ECMAScript environment can be extended by placing a specially written ECMAScript extension library in a certain directory on the electronic device along with a permissions file, which specifies which Web pages will have access to the extensions. The file is also important for security reasons.

SUMMARY OF THE INVENTION

CE companies, network operators and service providers are currently developing a standard to bring IPTV (Internet Protocol Television) and interactive web-based services to the connected television. Within this context, the inventors have considered scenarios wherein services, provided by service providers on the Internet, are allowed to actually control UPnP devices in a home network. The inventors have especially considered the issues of privacy.

Based on their findings, the inventors advocate installing a security system in order to guarantee that third-party services only control in-home network functionality when they are entitled to do so. The inventors further advocate guaranteeing that the privacy of the end-user is maintained by avoiding that the third-party service can be abused to acquire privacy-sensitive information through interaction with the devices in the in-home network.

The inventors therefore propose using a runtime environment model, e.g., a browser, an operating system or a Java Virtual Machine, or a modification to an existing runtime environment model, which addresses both the security and privacy concerns, which meets the full set of requirements specified for control of UPnP devices via CE-HTML, and which supports control of UPnP devices in the home network by a script from a (third-party) service provider.

An embodiment of the invention is based on providing a browser with a dual-scripting engine (or with two separated instances of the scripting engine with two different modes) in order to realize following properties. A public scripting engine is provided that implements the full functionality of the scripting engine of current mainstream browsers (including the XMLHttpRequest scripting object) and provides scripting support to communicate data (including, e.g., scripts encoded as a string) from the public scripting engine to a private scripting engine. The private scripting engine is provided to implement the full functionality of the scripting engine of current mainstream browsers, which furthermore supports the extended scripting APIs that could be used to access privacy-sensitive functionality, such as the aforementioned scripting API to control UPnP devices in the home network. The private scripting engine does not provide scripting support for data communication with the public scripting engine, and prevents communication to shared storage, other programs, or non-approved servers external to the home network, e.g. by forbidding XMLHttpRequest calls to non-approved servers outside the home network. There is no propagation of events from one scripting engine to the other.

Approval of communication to servers that are external to the home network could occur on the basis of per-event approval by the user and/or prior (for example per-server, per-domain, etc) approval by the user and/or the developer/deployer of the runtime environment. Prior approval could be obtained by means of configuration of the runtime environment (e.g., by maintaining a local or remotely stored list of servers or server domains that are exempted from the restriction on data communication from the private scripting engine) or indirectly derived from security profiles or certificates associated with the user, the external server, and/or the data source from which the script was obtained.

More specifically, an embodiment of the invention relates to a data processing system, e.g., a home network, comprising a runtime environment with scripting engine means for executing a script. The runtime environment comprises, for example, a browser, a Java Virtual Machine, an operating system, etc. The scripting engine means implements a public scripting engine and a private scripting engine. The runtime environment is configured to have the script executed by the public scripting engine if the script does not require access to a pre-determined resource at the system, and by the private scripting engine if the script requires access to the pre-determined resource. The pre-determined resource comprises, e.g., data on a hard-disk drive or another main memory of the data processing system that is outside the scope of the normal browser sandbox, or a UPnP home network. Only the private scripting engine has an interface (e.g., a scripting application program interface or API) for enabling the script to access the predetermined resource. The scripting engine means is configured to prevent the private scripting engine from communicating data to the public scripting engine or to a server external to the data processing system, unless such communication has been approved or in general communications to the server have been approved. There is no propagation of events from one scripting engine to the other.

Accordingly, if a script is executed by the public scripting engine, the script cannot access the resource as it does not have the proper API. If the script is executed by the private scripting engine, it does have access to the pre-determined resource. However, the script cannot cause data retrieved from the pre-determined resource to be communicated to the public scripting engine or to an external server, unless approved, e.g., as a result of lacking the proper interfaces for these purposes or denial of a request to use these interfaces to communicate to a non-approved external server. As a result, the privacy of the data at the pre-determined resource is guaranteed.

In an embodiment of the invention, the scripting engine means implements the public and private scripting engines by means of having two scripting engines available each with the relevant properties listed above. For example, the private scripting engine can be implemented as a plug-in, e.g., to a browser, that supports XHTML and CSS, and a special private ECMAScript engine instance that lacks any interfaces to communicate data to non-approved external servers, shared storage, or to the public scripting engine. The ECMAScript engine of the browser can function as the public scripting engine. As known, a plug-in can be used to add an API to existing software. Alternatively, the scripting engine means comprises a scripting engine that is selectively configurable to one of two operational modes: a public mode and a private mode. In the public mode, the scripting engine operates as if it were the public scripting engine, and in the private mode the scripting engine operates as if it were the private scripting engine.

The process of selecting which of the public or private scripting engines to let execute the script can be implemented in a variety of manners.

In a first manner, the script has a filename extension that indicates whether or not to have it executed on the private scripting engine. The filename extension is interpreted by the runtime environment that thereupon determines which one of the private and public scripting engines is to be invoked. For example, the script is referred to in an HTML file by means of its path that includes a file name extension of the script. If the script is a Javascript it may have the filename extension ".js" or ".xjs", depending on the context in which the script need to be executed. If the filename extension is ".js", the runtime environment interprets this as that the public scripting engine is the one to execute this script. If the filename extension is ".xjs", the runtime environment interprets this as that the private scripting engine is to execute the script.

In a second manner, the script is embedded in, or referred to by, another executable file that has an explicit statement specifying that the private scripting engine is to be invoked in order to execute the script. The explicit statement can comprise a declarative statement, e.g., a XHTML script element with the type attribute specifying which scripting engine is to be used to interpret the script, or a dedicated procedural statement, e.g., "switchToPrivateMode( )", or "privateScript.run(script)" within a script.

In a third manner, the script is embedded in, or referenced by, a statement in another executable file that implicitly requires invocation of the private scripting engine in order to execute the embedded or referenced script. This statement can be, e.g., an HTML <object> element specifying a MIME type that is associated with the pre-determined resource. For example, assuming that a runtime environment plug-in associated with control of the UPnP home network is identified by the MIME type "application/upnpcontrol", an executable file including an HTML object element of this MIME type implicitly specifies that the embedded or referenced script is to be run in the private scripting engine. Another type of statement that implicitly specifies the need to invoke the private scripting engine comprises a call to a function or method that is only supported in the context of the private scripting engine. For example, assuming that "readHDDContents( )" is only supported on the pre-determined resource by the private engine, the occurrence of the statement "readHDDContents" in a file implicitly signals the need to perform further execution of the file in the private engine.

Above embodiments of the invention relate to a data processing system. These embodiments are commercially relevant to set-makers, PC manufacturers, set-top box manufacturers, etc.

Another embodiment of the invention relates to a runtime environment with scripting engine means for use in such a data processing system. The runtime environment comprises, e.g., a browser, an operating system or a Java Virtual Machine. Such an embodiment is commercially relevant to software providers.

Another embodiment of the invention relates to a computer program product comprising computer-executable instructions which, upon execution, are being arranged for implementing the runtime environment during operational use of the data processing system. The software can be supplied on a data carrier such as a semiconductor memory (e.g., USB stick), or on an optical disc. The software can also be supplied as a download via the Internet.

Yet another embodiment of the invention relates to a data structure representing a script for being executed at the data processing system specified above. As known, a data structure indicates a physical or logical relationship among data elements, designed to support specific data processing function. In this sense the script in the invention represents a data structure. The data structure of the invention includes an execution control indication so as to enable selecting between the public scripting engine and the private scripting engine for executing the script. As specified above, the execution control indication is comprised in, e.g., the filename extension of the script, an explicit statement in another executable file wherein the script is embedded that is to be executed at the private scripting engine, or a statement in another executable file that implicitly signals the need to execute the embedded or referenced script in the private scripting engine. This embodiment is commercially relevant to providers of such scripts that are to access privacy-sensitive resources at the data processing system.

BRIEF DESCRIPTION OF THE DRAWING

The invention is explained in further detail, by way of example and with reference to the accompanying drawing, wherein FIG. 1 is a block diagram of a system in the invention.

DETAILED EMBODIMENTS

A web browser is typically used to render an electronic document in HTML format, but a host of special-purpose languages has been developed to control the browser's operation via executable content embedded in the HTML page. The executable content adds, e.g., interactivity and automation to the browser. Examples of these special-purpose languages are: ECMAScript, a versatile procedural scripting language superficially resembling Java; Cascading style sheets (CSS), which enable style metadata to be abstracted from content; XML, which can be used for content in conjunction with style metadata, as an alternative to HTML; and XSLT, a presentation language that transforms XML content into a new form. Techniques have evolved that involve the combination of XML and JavaScript scripting to improve the user's subjective impression of responsiveness. The Document Object Model standard ensures that all browsers respond in a predictable manner to the same JavaScript (Source: Wikipedia). Accordingly, a web browser provides a client-side environment for web applications and for executing scripts embedded in an electronic document, e.g., downloaded from a server. For more background on scripting, also see, e.g., WO 2006/106414, mentioned above.

A script embedded in the HTML document may be abused by the document provider to tamper with the system onto which the document has been downloaded or to obtain privacy-sensitive information about the system's user.

FIG. 1 is a block diagram of a system 100 in the invention. System 100 comprises a data processing system 102, herein further referred to as client 102, with a network interface 104 for data communication with a server 106 via data network 108. Client 102 is, e.g., a personal computer, a set-top box, a home network, etc. Client 102 comprises a runtime environment 110, e.g., a browser, an operating system or a Java Virtual Machine. Runtime environment 110 has scripting engine means for executing a script. For example, runtime environment 110 comprises a browser and the script is received in an electronic HTML document, e.g., as supplied by server 106 or as supplied via a USB stick or via a PC. The scripting engine means implements a public scripting engine 112 and a private scripting engine 114. Runtime environment 110 is configured to have the script executed by public scripting engine 112 if the script does not require access to a pre-determined resource at client 102, e.g., data outside the scope of the normal (browser) sandbox on a hard-disk drive (HDD) 124 or on a UPnP home network 126. Runtime environment 110 is configured to have the script executed by private scripting engine 114 if the script requires access to pre-determined resource 124 or 126.

There are several ways of implementing this selective execution as is discussed further below, but assume for the time being that runtime environment 110 is thus configured.

If the script does not require access to data on HDD 124 outside the scope of the normal (browser) sandbox or on UPnP home network 126, the script is executed by scripting engine 112. For example, the script, specifying animation of a web resource in a web page rendered in a browser, does not require access to HDD 124 or UPnP home network 126 for this purpose.

If the script does require access to data on HDD 124 outside the scope of the normal (browser) sandbox or data on UPnP home network 126, the script is executed by private scripting engine 114. For example, the script scans and manages the multimedia content that is stored on a UPnP MediaServer in the home network.

Public scripting engine 112 does not have an interface, e.g., a scripting application program interface (API), to a software application 122 that interacts with data outside the scope of the normal browser sandbox on HDD 124 or a UPnP Control point 128 that interacts with UPnP home network 126. Private scripting engine 114, on the other hand, does have a scripting API 120 to software application 122 that can access HDD 124 and a scripting API 130 that can access UPnP home network 126. Private scripting engine 114 prevents data communication with server 106 unless the communication to server 106 has been approved, whereas public scripting engine does have a communication interface (not shown) that does not make this distinction.

Approval of communication to servers that are external to the home network could occur on the basis of per-event approval by the user and/or prior (for example per-server, per-domain, etc) approval by the user and/or the developer/deployer of the runtime environment. Prior approval could be obtained by means of configuration of the runtime environment (e.g., by maintaining a local or remotely stored list of servers or server domains that are exempted from the restriction on data communication from the private scripting engine) or indirectly derived from security profiles or certificates associated with the user, the external server, and/or the data source from which the script was obtained.

The diagram of FIG. 1 illustrates the scenario wherein public scripting engine 112 and private scripting engine 114 are implemented as separate scripting engines. For example, private scripting engine 114 is implemented as a plug-in, e.g., to a browser, that supports XHTML and CSS, and a special private ECMAScript engine instance preventing non-approved data communication to external server 106 and lacking any interfaces to communicate data to shared storage such as cookies, or to public scripting engine 112. The ECMAScript engine of the browser can function as public scripting engine 112. As known, a plug-in can be used to add an API to existing software. For completeness, cookies are considered persistent shared storage within the scope of the (browser) sandbox for services that originate from the same domain.

In an embodiment of the invention, a script that is received by runtime environment 110, is routed by default to public scripting engine 112 for being executed, except if the runtime environment can determine, e.g., by means of the filename extension of the script, or analysis of the script, the proper one of scripting engines 112 and 114 that is to be used to execute the script. Public scripting engine 112 is configured to conditionally forward the script to private scripting engine 114 if, for example, the script includes an explicit statement requesting execution in private scripting engine 114. Runtime environment 110 interprets the filename extension and determines on the basis thereof in which of scripting engines 112 and 114 the script is to be executed.

For example, the script is referred to in an HTML file by means of its path that includes a filename extension of the script. If the script is a Javascript it may have the filename extension ".js" or ".xjs". If the filename extension is ".js", runtime environment 110 determines that public scripting engine 112 is the one to execute this script. If the filename extension is ".xjs", runtime environment 110 interprets this as that private scripting engine 114 is to execute the script, and forwards the script to private scripting engine 114 to be executed. Runtime environment 110 may use this as a trigger to switch modes so that all scripts that are included and/or referred to by the HTML file (including the .js files that were downloaded before), will be executed in private scripting engine 114, instead of in public scripting engine 112.

As another example, the script is embedded in another script that has an explicit statement specifying that private scripting engine 112 is to be invoked in order to execute the embedded script. Public scripting engine 112 executes the other script and sooner or later arrives at the explicit statement. Public scripting engine 112 is configured to forward the embedded script to private scripting engine 114 via the one-way interface, referred to above, upon executing the explicit statement via a one-way interface (not shown) between engines 112 and 114. That is, private scripting engine is enabled to communicate data to private scripting engine 114, but private scripting engine 114 is not enabled to communicate data to public scripting engine 114. The one-way data communication interface between scripting engines 112 and 114 can be implemented by extending the plug-in interface with data communication methods allowing a script running in public scripting engine 112 to send data to the plug-in.

As still another example, the object (in object-oriented programming context) representing the script is specified by its type or class. The type declared in the script indicates whether it will be using HDD 124 or UPnP home network 126. If the type indicates that the script is an application to be run on UPnP home network 126 or to be using API 130 to UPnP home network 126, public scripting engine 112 forwards, via the one-way interface, the script to private scripting engine 114 so as to have the script executed. This is because the type or class is pre-determined or pre-configured to be privacy-sensitive, and therefore implicitly requires invocation of private scripting engine 114 in order to execute the embedded or referenced script. This statement can be, e.g., an HTML object element specifying a MIME type that is associated with the pre-determined resource. For example, assuming that a runtime environment plug-in associated with control of the UPnP home network is identified by the MIME type "application/upnpcontrol", an executable file including an HTML <object> element of this MIME type implicitly specifies that the embedded or referenced script is to be run in private scripting engine 114. Another type of statement that implicitly specifies the need to invoke private scripting engine 114 comprises a call to a function or method that is only supported in the context of private scripting engine 114. For example, assuming that "readHDDContents( )" is only supported on the pre-determined resource by private engine 114, the occurrence of the statement "readHDDContents" in a file implicitly signals the need to perform further execution of the file in private scripting engine 114.

Accordingly, owing to the specificity of the data communication capabilities of scripting engines 112 and 114, unless such communication has been approved, privacy sensitive data residing at resources 124 or 126 of client 102 cannot be made available to server 106 via a script provided by an external supplier, e.g., in an electronic html document retrieved from server 106 and rendered in browser 110. If the script is executed by engine 112, there is no access to pre-determined resources 124 and 126. If the script is executed by engine 114, the script has access to pre-determined resources 124 and 126. However, there is no way to communicate data retrieved from resources 124 and 126 to server 106, unless such communication has been approved, owing to the fact that the interface for this purpose limits communications to approved servers only.

In above example, scripting engines 112 and 114 have been implemented as two separate engines. As an alternative, scripting engines 112 and 114 are implemented by means of a single scripting engine that is selectively configurable to one of two operational modes: a public mode and a private mode. In the public mode, the scripting engine operates as if it were public scripting engine 112, and in the private mode the scripting engine operates as if it were private scripting engine 114. A second alternative is to implement public and private scripting engines 112 and 114 as logically separate instances of the same scripting engine. As an example, assume the use of a mainstream browser as runtime environment 110 with a security system that supports the granting of different permissions to scripts, which originate from different domains. Then, public scripting engine 112 can be implemented as the normal scripting engine of the browser, with the addition of a one-way communication interface towards private scripting engine 114. Private scripting engine 114 can be implemented by configuring the scripting engine of the browser such that scripts that are required to run in private scripting engine 114, are actually executed within the context of a specific domain, regardless of the domain wherein the external script has originated. Scripts that are running within this domain are granted the privilege to control the pre-determined resource through a browser plug-in, but are prevented from communicating data to public scripting engine 112 or a server external to data processing system 102, such as server 106, unless such communication has been approved.

The invention claimed is:

1. A data processing system comprising:
   a private resource;
   a connection to a public network;
   a hardware processor configured to process a public script instance and a distinct private script instance of a scripting engine while providing access to the private resource; and
   a memory configured to provide a browser environment, the browser environment configured to enable execution of: (i) the public script instance of the scripting engine, including allowing access to the public network when the public script instance of the scripting engine does not require access to the private resource; and (ii) the private script instance of the scripting engine as a plug-in to the browser, the private script instance of the scripting engine requiring access to the private resource including allowing access to the private resource when the access to the public network is denied;
   wherein the browser is configured with a data communication plug-in interface to allow communication from the public script instance of the scripting engine to the private script instance of the scripting engine, and to prevent communication from the private script instance of the scripting engine to the public script instance of the scripting engine unless there is a prior approval; and
   wherein only the private script instance of the scripting engine comprises a scripting API configured to enable access to the private resource.

2. The data processing system of claim 1, further comprising an interface to one or more of local storage devices, a reader for a removable memory, a reader for removable storage devices, a home network comprising one or more home network storage devices, and a WAN network including at least one server comprising one or more WAN network storage devices.

3. The data processing system of claim 2, wherein the private resource is selected from at least one of the local storage devices, the removable memory, the removable storage devices, the home network storage devices, and the WAN network storage devices.

4. A data processing system comprising:
   a private resource;
   a connection to a public network; and
   a hardware processor configured to: (i) process an operating system environment; (ii) execute a scripting engine having a public script instance and a distinct private script instance within the operating system environment; and (iii) provide access to private resources and the public network;
   wherein the operating system environment is configured to enable execution of: (i) the public script instance of the scripting engine including allowing access to the public network when the public script instance of the scripting engine does not require access to the private resources; and (ii) the private script instance of the scripting engine requiring access to the private resources including allowing access to the private resources when the access to the public network is denied;
   wherein the operating system is configured with a data communication interface to allow communication from the public script instance of the scripting engine to the private script instance of the scripting engine, and to prevent communication from the private script instance of the scripting engine to the public script instance of the scripting engine unless there is a prior approval; and
   wherein only the private script instance of the scripting engine comprises a scripting API configured to enable access to the private resource.

5. A non-transitory computer readable medium comprising computer-executable instructions which, upon execution on a processor performs a method of executing a scripting engine, the method comprising acts of:
   configuring the processor to process a runtime browser;
   executing a public instance of the scripting engine and a distinct private script instance of the scripting engine within the browser environment; and
   providing access to a private resource, wherein only the private script instance of the scripting engine includes an interface for access to the private resources;

wherein the browser environment is configured to enable execution of: (i) the public script instance of the scripting engine including allowing access to the public network when the public script instance of the scripting engine does not require access to the private resource; and (ii) the private script instance of the scripting engine requiring access to the private resources including allowing access to the private resource when the access to the public network is denied;

wherein the browser environment is configured with a data communication plug-in interface to allow communication from the public script instance of the scripting engine to the private script instance of the scripting engine, and to prevent communication from the private script instance of the scripting engine to the public script instance of the scripting engine unless there is a prior approval; and wherein the private script instance of the scripting engine comprises a scripting API configured to enable access to the private resource.

6. A method for execution of a scripting engine, the method comprising acts of:

providing an operating system environment on a processor having access to a private resource;

executing a public script instance and a distinct private script instance of the scripting engine on the processor within the operating system environment for enabling execution of: (i) the public script instance of the scripting engine including allowing access to the public network when the public script instance of the scripting engine does not require access to the private resource; and (ii) the private script instance of the scripting engine requiring access to the private resource including allowing access to the private resource when the access to the public network is denied;

wherein the operating system environment is configured with a data communication interface to allow communication from the public script instance of the scripting engine to the private script instance of the scripting engine, and to prevent communication from the private script instance of the scripting engine to the public script instance of the scripting engine unless there is a prior approval; and wherein only the private script instance includes an interface for access to the private resource.

* * * * *